(12) United States Patent
Park et al.

(10) Patent No.: US 12,579,976 B2
(45) Date of Patent: Mar. 17, 2026

(54) USER TERMINAL, DIALOGUE MANAGEMENT SYSTEM, CONTROL METHOD OF USER TERMINAL, AND DIALOGUE MANAGEMENT METHOD

(71) Applicants: HYUNDAI MOTOR COMPANY, Seoul (KR); KIA CORPORATION, Seoul (KR)

(72) Inventors: Minjae Park, Seongnam-si (KR); Jaemin Moon, Yongin-si (KR); Sungwang Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 406 days.

(21) Appl. No.: 18/116,994

(22) Filed: Mar. 3, 2023

(65) Prior Publication Data

US 2023/0282212 A1 Sep. 7, 2023

(30) Foreign Application Priority Data

Mar. 4, 2022 (KR) ........................ 10-2022-0028315

(51) Int. Cl.
G10L 15/22 (2006.01)
B60W 50/10 (2012.01)
(Continued)

(52) U.S. Cl.
CPC ............. G10L 15/22 (2013.01); B60W 50/10 (2013.01); G10L 15/1815 (2013.01);
(Continued)

(58) Field of Classification Search
CPC ..... G10L 15/22; G10L 15/1815; G10L 15/30; G10L 25/51; G10L 2015/22;
(Continued)

(56) References Cited

U.S. PATENT DOCUMENTS 9,898,250 B1 * 2/2018 Williams ................ G10L 15/22
12,002,458 B1 * 6/2024 Gao ........................ G10L 15/22
(Continued)

FOREIGN PATENT DOCUMENTS

JP 2014063145 A 4/2014
JP 2019109422 A 7/2019
(Continued)

*Primary Examiner* — Paras D Shah
*Assistant Examiner* — Fouzia Hye Solaiman
(74) *Attorney, Agent, or Firm* — Morgan, Lewis & Bockius LLP

(57) ABSTRACT
A user terminal, a control method thereof, a dialogue management system and a dialogue management method may output an ambient sound related to a user intention in real time together with a system response to a user's voice command, thereby providing a user with a sense of presence and enabling a natural dialogue with the user.
The user terminal includes at least one microphone; a speaker; a communication module configured to communicate with a server; and a controller configured to control the speaker to output a system response corresponding to a voice command of a user, when the user's voice command is input through the at least one microphone, wherein the controller is configured to control the speaker to output an ambient sound matching the voice command together with the system response.

17 Claims, 11 Drawing Sheets

(51) Int. Cl.

| | |
|---|---|
| *G10L 15/18* | (2013.01) |
| *G10L 15/30* | (2013.01) |
| *G10L 25/51* | (2013.01) |
| *H04R 1/40* | (2006.01) |
| *H04R 3/00* | (2006.01) |

(52) U.S. Cl.

CPC .............. *G10L 15/30* (2013.01); *G10L 25/51* (2013.01); *H04R 1/406* (2013.01); *H04R 3/005* (2013.01); *B60W 2420/54* (2013.01); *B60W 2540/21* (2020.02); *G10L 2015/223* (2013.01); *H04R 2499/13* (2013.01)

(58) Field of Classification Search

CPC .......... G10L 15/1822; G10L 2015/225; B60W 50/10; B60W 2420/54; B60W 2540/21; H04R 1/406; H04R 3/005; H04R 2499/13; G06F 3/167

USPC ........................................................ 704/257

See application file for complete search history.

(56) References Cited

U.S. PATENT DOCUMENTS

| | | | | |
|---|---|---|---|---|
| 2015/0120151 | A1* | 4/2015 | Akay ...................... | B60R 25/01 |
| | | | | 701/1 |
| 2019/0282780 | A1* | 9/2019 | Kwak ................... | A61M 21/02 |
| 2019/0303095 | A1* | 10/2019 | Sohoni ................... | B60K 35/65 |
| 2021/0006927 | A1* | 1/2021 | Asada ..................... | G10L 15/22 |
| 2022/0128373 | A1* | 4/2022 | Lee .......................... | G10L 15/22 |
| 2023/0038039 | A1* | 2/2023 | Zhao ......................... | G01S 5/16 |

FOREIGN PATENT DOCUMENTS

| | | | |
|---|---|---|---|
| JP | 2021026124 | A | 2/2021 |
| KR | 10-2019-0102454 | A | 9/2019 |
| KR | 10-2021-0010404 | A | 1/2021 |

\* cited by examiner

1

110

120

SPEECH RECOGNITION MODULE

NATURAL LANGUAGE UNDERSTANDING MODULE

FIG. 4

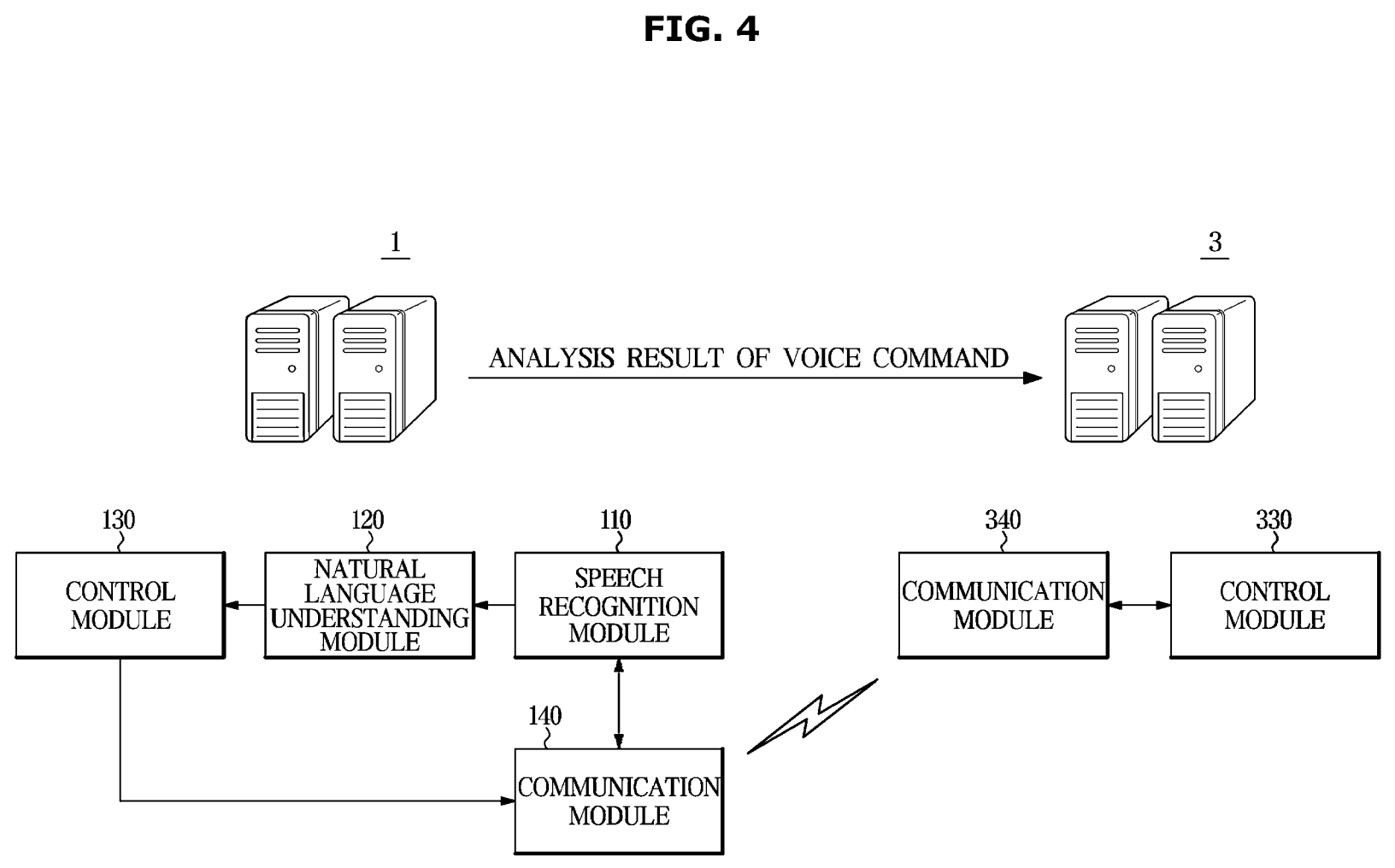

ANALYSIS RESULT OF VOICE COMMAND

1

3

110 SPEECH RECOGNITION MODULE

120 NATURAL LANGUAGE UNDERSTANDING MODULE

130 CONTROL MODULE

140 COMMUNICATION MODULE

330 CONTROL MODULE

340 COMMUNICATION MODULE

USER TERMINAL, DIALOGUE MANAGEMENT SYSTEM, CONTROL METHOD OF USER TERMINAL, AND DIALOGUE MANAGEMENT METHOD

CROSS-REFERENCE TO RELATED APPLICATION

This application is based on and claims priority under 35 U.S.C. § 119 to Korean Patent Application No. 10-2022-0028315, filed on Mar. 4, 2022 in the Korean Intellectual Property Office, the disclosure of which is incorporated herein by reference.

TECHNICAL FIELD

The disclosure relates to a user terminal, a dialogue management system, a control method of a user terminal and a dialogue management method that may provide a speech recognition service.

BACKGROUND

A speech recognition technology is capable of identifying what is intended by a user from a user's speech and providing a service corresponding to the identified user intention. Also, the speech recognition technology enables a specific device to be controlled and specific information to be provided according to a user intention.

A dialogue management technology goes beyond simply recognizing a user's voice, and manages a dialogue with a user required to provide a service corresponding to a user intention.

Through the dialogue management technology, when more information is required to provide a service corresponding to a user intention, dialogues with the user may be performed to obtain the information, and when more guides are require to provide a service corresponding to a user intention, the guides may be provided through a system response.

SUMMARY

An aspect of the disclosure provides a user terminal, a control method thereof, a dialogue management system and a dialogue management method that may output an ambient sound related to a user intention in real time together with a system response to a user's voice command, thereby providing a user with a sense of presence and enabling a natural dialogue with the user.

Additional aspects of the disclosure will be set forth in part in the description which follows and, in part, will be obvious from the description, or may be learned by practice of the disclosure.

According to an aspect of the disclosure, there is provided a user terminal including: at least one microphone; a speaker; a communication module configured to communicate with a server; and a controller configured to control the speaker to output a system response corresponding to a voice command of a user based on the user's voice command input through the at least one microphone, wherein the controller is configured to control the speaker to output an ambient sound matching the voice command together with the system response.

The controller is configured to collect the ambient sound using the at least one microphone.

The user terminal is a vehicle, and the at least one microphone includes: a first microphone to which the user's voice command is input; and at least one second microphone provided in at least one of a rear seat area or an exterior surface of the vehicle.

The controller is configured to open the at least one second microphone to collect the ambient sound from the vehicle.

When an intent corresponding to the voice command relates to a control of a constituent component of the vehicle, the controller is configured to open a second microphone adjacent to the constituent component of the vehicle among the at least one second microphone to collect the ambient sound.

The communication module is configured to receive the system response and the ambient sound from the server.

When an intent corresponding to the voice command relates to a control of a constituent component of the vehicle, the controller is configured to control the speaker to output the system response received from the server and the ambient sound collected from the second microphone.

According to an aspect of the disclosure, there is provided a dialogue management system including: a communication module configured to receive information about a voice command of a user; and a control module configured to determine a provider of an ambient sound matching the voice command, in response to a determination that the provider of the ambient sound matching the voice command is an external server, the control module configured to control the communication module to request the external server for the ambient sound, and in response to a determination that the provider of the ambient sound matching the voice command is a user terminal to which the user's voice command is input, the control module configured to control the communication module to request the user terminal for the ambient sound.

The information about the user's voice command includes an intent and an entity corresponding to the user's voice command, and the ambient sound matching the voice command includes a sound collected in real time in connection with the intent and the entity.

The control module is configured to generate a system response corresponding to the voice command, and in response to the determination that the provider of the ambient sound matching the voice command is the user terminal, the control module is configured to control the communication module to transmit the system response to the user terminal.

The control module is configured to generate a system response corresponding to the voice command, and in response to the determination that the provider of the ambient sound matching the voice command is the external server, the control module is configured to control the communication module to transmit the system response and the ambient sound, provided from the external server, to the user terminal.

According to an aspect of the disclosure, there is provided a control method of a user terminal including at least one microphone and a speaker, the control method including: receiving a voice command of a user through the at least one microphone; obtaining a system response corresponding to the voice command; obtaining an ambient sound matching the voice command; and outputting the system response together with the ambient sound through the speaker.

The obtaining of the ambient sound matching the voice command includes collecting the ambient sound using the at least one microphone.

The user terminal is a vehicle, the at least one microphone includes: a first microphone to which the user's voice command is input; and at least one second microphone provided in at least one of a rear seat area or an exterior surface of the vehicle, and the obtaining of the ambient sound matching the voice command includes opening the at least one second microphone to collect the ambient sound from the vehicle.

The obtaining of the ambient sound matching the voice command includes receiving the system response from a server.

The obtaining of the ambient sound matching the voice command includes receiving the ambient sound from a server.

When an intent corresponding to the voice command relates to a control of a constituent component of the vehicle, the outputting of the system response together with the ambient sound includes outputting the system response received from a server and the ambient sound collected from the at least one second microphone.

According to an aspect of the disclosure, there is provided a dialogue management method including: receiving information about a voice command of a user; determining a provider of an ambient sound matching the voice command; in determination that the provider of an ambient sound matching the voice command is an external server, requesting the external server for the ambient sound, and in determination that the provider of an ambient sound matching the voice command is a user terminal to which the user's voice command is input, requesting the user terminal for the ambient sound.

The dialogue management method further includes: generating a system response corresponding to the voice command; and in response to the determination that the provider of an ambient sound matching the voice command is the user terminal, transmitting the system response to the user terminal.

The dialogue management method further includes: generating a system response corresponding to the voice command; and in response to the determination that the provider of an ambient sound matching the voice command is the external server, transmitting the system response and the ambient sound, provided from the external server, to the user terminal.

BRIEF DESCRIPTION OF THE DRAWINGS

These and/or other aspects of the disclosure will become apparent and more readily appreciated from the following description of the embodiments, taken in conjunction with the accompanying drawings of which:

FIGS. 4 and 5 are diagrams illustrating examples where a speech recognition system and a dialogue management system are implemented as separate servers;

DETAILED DESCRIPTION

Figure 1:
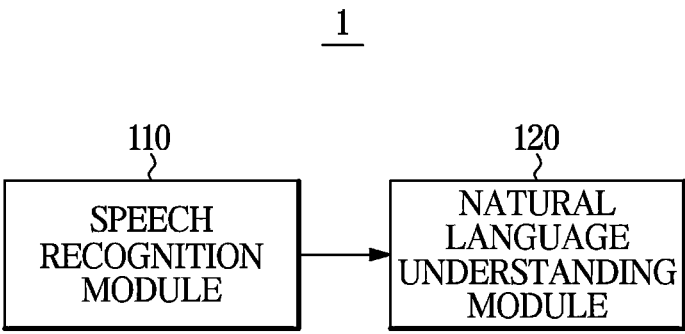
FIG. 1 is a block diagram illustrating an operation of a speech recognition system.

The embodiments set forth herein and illustrated in the configuration of the disclosure are only preferred embodiments, so it should be understood that they may be replaced with various equivalents and modifications at the time of the disclosure.

Terminologies used herein are for the purpose of describing particular embodiments only and is not intended to limit the disclosure. It is to be understood that the singular forms are intended to include the plural forms as well, unless the context clearly dictates otherwise.

It will be further understood that the terms "include", "comprise" and/or "have" when used in this specification, specify the presence of stated features, integers, steps, operations, elements, and/or components, but do not preclude the presence or addition of one or more other features, integers, steps, operations, elements, components, and/or groups thereof.

Further, the terms such as "~part", "~device", "~block", "~member", "~module", and the like may refer to a unit for processing at least one function or act. For example, the terms may refer to at least process processed by at least one hardware, such as field-programmable gate array (FPGA)/ application specific integrated circuit (ASIC), software stored in memories or processors.

It will be understood that, although the terms first, second, etc. may be used herein to describe various elements, these elements should not be limited by these terms.

Reference numerals used for method steps are just used for convenience of explanation, but not to limit an order of the steps. Thus, unless the context clearly dictates otherwise, the written order may be practiced otherwise.

The term "at least one" used herein includes any and all combinations of the associated listed items. For example, it should be understood that the term "at least one of a, b, or c" may include only a, only b, only c, both a and b, both a and c, both b and c, or all of a, b and c.

Hereinafter, embodiments of the disclosure are described in detail with reference to the accompanying drawings.

FIG. 1 is a block diagram illustrating an operation of a speech recognition system.

Referring to FIG. 1, a speech recognition system 1 includes a speech recognition module 110 converting a user's voice command into text and a natural language understanding module 120 determining a user intention corresponding to the text.

The speech recognition module 110 may be implemented with a speech to text (STT) engine, and perform conversion into text by applying a speech recognition algorithm to a user's speech.

For example, the speech recognition module 110 may extract feature vectors from a user's speech by applying a feature vector extraction method such as a cepstrum, a linear predictive coefficient (LPC), a Mel frequency cepstral coefficient (MFCC), a filter bank energy, or the like.

Also, a recognition result may be obtained by comparing extracted feature vectors and trained reference patterns. To this end, an acoustic model for modeling and comparing signal characteristics of voice or a language model for modeling a linguistic order of recognition vocabulary such as words or syllables may be used.

In addition, the speech recognition module 110 may convert the user's speech into the text based on learning where deep learning or machine learning is applied. In the embodiment, a way of converting the user's speech into the text by the speech recognition module 110 is not limited thereto, and a variety of speech recognition techniques may be applied to convert the user's speech into the text.

The natural language understanding module 120 may apply a natural language understanding (NLU) technique to determine a user intention included in the text. Accordingly, the natural language understanding module 120 may include an NLU engine that determines the user intention by applying the NLU technique to an input sentence. Here, the text output by the speech recognition module 110 is a sentence input to the natural language understanding module 120.

For example, the natural language understanding module 120 may recognize an entity from the input sentence. The entity is a proper noun such as a name of an individual person, place, organization, time, day, currency, and the like. Named-entity recognition (NER) is for identifying an entity in a sentence and classifying a type of the identified entity. A keyword may be extracted from a sentence through named-entity recognition to understand the meaning of the sentence.

Also, the natural language understanding module 120 may determine a domain from the input sentence. The domain may be for identifying a subject of the user's speech. For example, domains representing various subjects such as vehicle control, schedule, information about weather or traffic conditions, text transmission, navigation, etc., may be determined based on the input sentence.

In addition, the natural language understanding module 120 may analyze a speech act of the input sentence. The speech act analysis is for analyzing an intention of a user's speech, such as whether the user's speech intends to ask a question, make a request, make a response, express a feeling, or the like.

The natural language understanding module 120 may classify an intent included in the input sentence and extract a slot required to perform the corresponding intent. A slot may be filled by an entity.

For example, when the input sentence is "turn on the air conditioner", a domain may be [vehicle control] and an intent may be [turn on, air conditioner]. Here, [turn on] may be an action, [air conditioner] may be a target, and an entity required to perform control corresponding to such intent may be [temperature, air volume].

For instance, the natural language understanding module 120 may extract information such as a domain, intent, entity, etc., from the input sentence based on deep learning.

The above-described speech recognition system 1 may be implemented as at least one memory storing a program performing the aforementioned operations and at least one processor implementing a stored program.

The constituent components of the speech recognition system 1 are divided based on their operation or function, and all or a portion of the constituent components may share a memory or a processor. That is, the speech recognition module 110 and the natural language understanding module 120 are not necessarily physically separated and may share a memory or a processor.

For example, the speech recognition system 1 may be implemented as a server. The speech recognition system 1 may receive a voice command from a user terminal through a communication module, and output an analysis result (intent, entity, etc.) of the voice command through conversion into text, natural language understanding process, and the like.

Alternatively, a user terminal may be equipped with the speech recognition system 1 depending on a processor performance or a memory capacity of the user terminal.

The user terminal may serve as a gateway between a user and the speech recognition system 1. The user terminal may be a mobile device including an input/output interface such as a microphone, a speaker, a display, etc., or be a vehicle.

For a detailed description, an example where the user terminal is a vehicle is described below.

Figure 2:
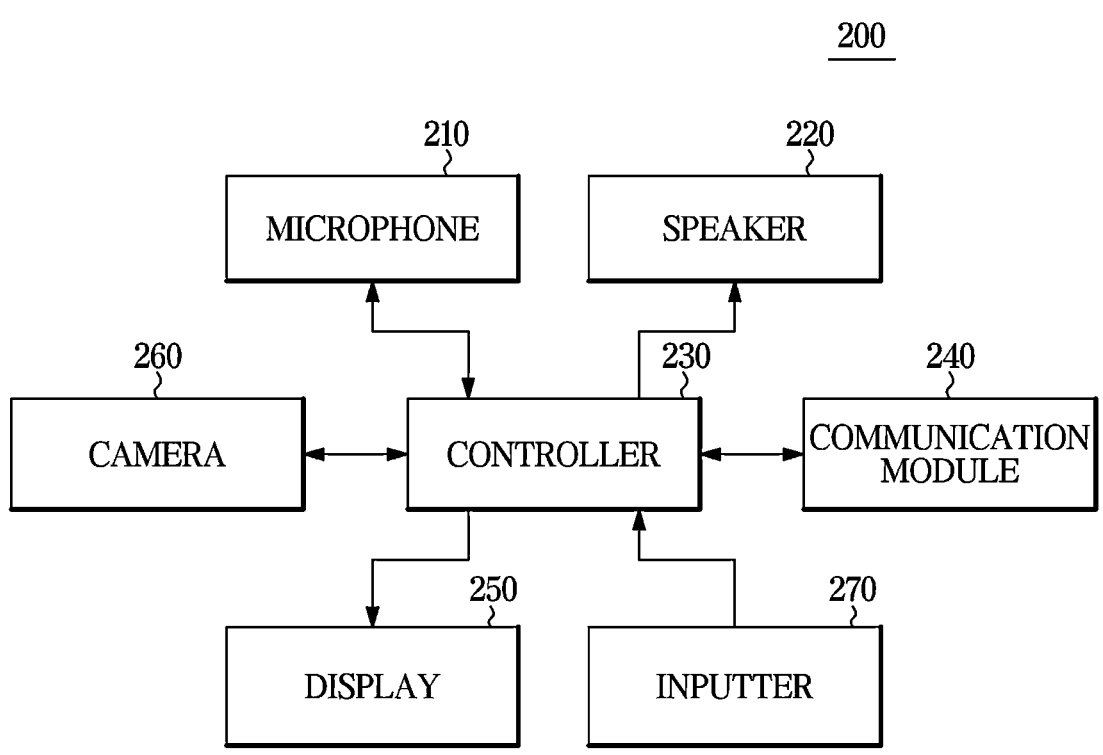
FIG. 2 is a block diagram illustrating a user terminal according to an embodiment.
Figure 3:
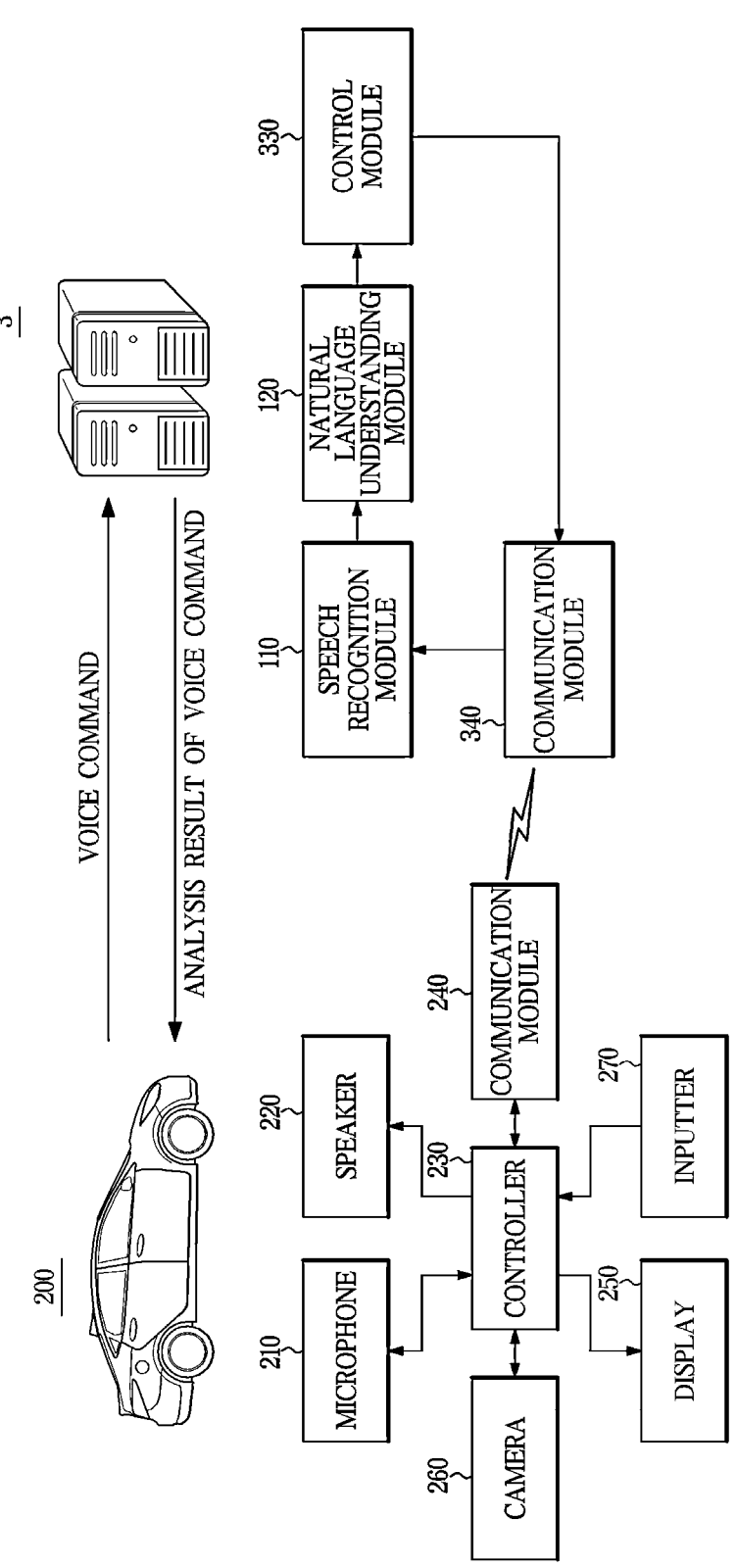
FIG. 3 is a diagram schematically illustrating a relationship between a user terminal and a speech recognition system according to an embodiment.

FIG. 2 is a block diagram illustrating a user terminal according to an embodiment. FIG. 3 is a diagram schematically illustrating a relationship between a user terminal and a speech recognition system according to an embodiment.

Referring to FIG. 2, a user terminal 200 according to an embodiment includes a microphone 210, a speaker 220, a camera 260, a display 250, a communication module 240, and a controller 230 controlling the aforementioned constituent components and other constituent components of a vehicle.

The microphone 210 may be provided in the user terminal 200 to receive a user's voice command. When the user terminal 200 is a vehicle, a user may be a driver or an occupant. In this case, the microphone 210 may be provided on a steering wheel, a center fascia, a headliner, or a rear-view mirror, etc., to receive a voice command from the driver or a front occupant.

Also, two or more microphones 210 may be provided. When the user terminal 200 is a vehicle, as described above, a first microphone may be provided to receive a driver's voice command, and a second microphone may be provided to receive a rear occupant's voice command, for example, be provided on at least one of a rear armrest, rear doors, B pillar or C pillar, or headliner of the vehicle. A position of the second microphone is not limited, as long as the rear occupant's voice command may be input.

In addition, the second microphone may be provided on an exterior surface of the vehicle. The second microphone provided on an exterior surface of the vehicle may be used to collect a sound occurring outside the vehicle or generated when an external constituent component of the vehicle is operating.

The speaker 220 is provided in the user terminal 200 to output a variety of audios. For example, music, radio or audio of multimedia content may be output, and audios for route guidance while a navigation function is operating may be output. Also, as will be described later, a system response may be output as feedback about a user's voice command.

When the user terminal 200 is a vehicle, the camera 260 may capture at least one of an internal image or an external image of the vehicle. Accordingly, the camera 260 may be provided inside and/or outside of the vehicle. Alternatively, according to embodiments, the camera 260 may be omitted.

The user terminal 200 may include an inputter 270 for manually receiving a user command. When the user terminal 200 is a vehicle, the inputter 270 may include an inputter provided as a jog shuttle or a button, in an area where an audio, video, navigation (AVN) is provided on a center fascia, in an area where a gearbox is provided, or on a steering wheel.

Also, to receive a control command related to passenger seats, the inputter 270 may include an inputter provided on each door of the vehicle, and an inputter provided on a front armrest or a rear armrest.

In addition, the inputter 270 may include a touchpad that implements a touchscreen by being provided integrally with the display 250.

When the user terminal 200 is a vehicle, the display 250 may include an AVN display provided on a center fascia of the vehicle, a cluster display, or a head-up display (HUD).

Alternatively, the display 250 may include a rear seat display provided on a back of the front seat's headrest so that a rear occupant may see the rear seat display. When the vehicle is a multi-seater vehicle, the display 250 may include a display mounted on a headliner of the vehicle.

The display 250 may be provided anywhere, as long as users inside the vehicle may see the display 250, and the position or the number of displays 250 are not limited.

The display 250 may display information about a current state of vehicle, information for executing an AVN function, information for executing a speech recognition function, and the like.

The communication module 240 may include a wired communication module exchanging data with external devices by wire, and a wireless communication module exchanging data with external devices wirelessly.

According to an exemplary embodiment of the present disclosure, the communication module 240 may include a processor (e.g., computer, microprocessor, CPU, ASIC, circuitry, logic circuits, etc.) and an associated non-transitory memory storing software instructions which, when executed by the processor, provides the functionalities of communication module 240. Herein, the memory and the processor may be implemented as separate semiconductor circuits. Alternatively, the memory and the processor may be implemented as a single integrated semiconductor circuit. The processor may embody one or more processor(s).

The wired communication module may exchange data with external devices connected through a USB terminal, an AUX terminal, and the like.

The wireless communication module may wirelessly communicate with a base station or an access point (AP), and exchange data with external devices through a base station or an access point.

For example, the wireless communication module may wirelessly communicate with an access point using Wi-Fi (Wi-Fi ⊙, IEEE 802.11 standard), or communicate with a base station using a code division multiple access (CDMA), wideband CDMA (WCDMA), global system for mobile communication (GSM), long term evolution (LTE), 5G, Wibro, and the like.

Also, the wireless communication module may directly communicate with external devices. For example, the wireless communication module may exchange data with external devices in a short distance using a Wi-Fi direct, Bluetooth (Bluetooth⊙, IEEE 802.15.1 standard), Zigbee (Zigbee⊙, IEEE 802.15.4 standard), etc.

For example, when the user terminal 200 is a vehicle, the communication module 240 may communicate with a mobile device located inside the vehicle through a Bluetooth communication, thereby receiving information (user images, user speech, contact numbers, schedules, etc.) obtained by or stored in the mobile device. Also, the communication module 240 may communicate with an external server including a speech recognition apparatus 100 through 4G or 5G communication, thereby transmitting a user's voice command and receiving an analysis result of the user's voice command.

In addition, when the user terminal 200 is a vehicle, the user terminal 200 may include an air conditioning device for adjusting an indoor temperature, a window adjustment device for opening/closing vehicle windows, a seat heating device for heating seats, a seat adjustment device for adjusting a position, height, angle of a seat and a lighting device for adjusting an indoor illuminance level, and the like, in addition to devices related to driving of the vehicle.

The aforementioned devices are for providing convenience functions related to the vehicle, and a portion of the devices may be omitted depending on models or options. Alternatively, other devices other than the aforementioned devices may be further included in the vehicle.

The controller 230 may turn on or off the microphone 210 or the camera 260, process and store a speech input to the microphone 210 or an image captured by the camera 260, and transmit to another device through the communication module 240.

Also, the controller 230 may control the display 250 to display an image, and control the speaker 220 to output an audio.

In addition, the controller 230 may perform various controls related to the vehicle. For example, the controller 230 may control at least one of the air conditioning device, the window adjustment device, the seat heating device, the seat adjustment device or the lighting device, according to a user command input through the inputter 270 or the microphone 210.

According to an exemplary embodiment of the present disclosure, the controller 230 may include a processor (e.g., computer, microprocessor, CPU, ASIC, circuitry, logic circuits, etc.) and an associated non-transitory memory storing software instructions which, when executed by the processor, provides the functionalities of controller 230. Herein, the memory and the processor may be implemented as separate semiconductor circuits. Alternatively, the memory and the processor may be implemented as a single integrated semiconductor circuit. The processor may embody one or more processor(s).

The controller 230 may include at least one memory storing a program performing the aforementioned operations or operations to be described later and at least one processor implementing a stored program.

Referring to the example of FIG. 3, the above-described speech recognition module 110 and natural language understanding module 120 may be provided in a dialogue management system 3. That is, analysis of a voice command may be performed by the dialogue management system 3.

For example, the dialogue management system 3 may be implemented as a server. The dialogue management system 3 may include a communication module 340 communicating with a device such as a user terminal or another server, and a control module 330 generating a system response based on an analysis result of a voice command.

According to an exemplary embodiment of the present disclosure, the communication module 340 may include a processor (e.g., computer, microprocessor, CPU, ASIC, circuitry, logic circuits, etc.) and an associated non-transitory memory storing software instructions which, when executed by the processor, provides the functionalities of communication module 340. Herein, the memory and the processor may be implemented as separate semiconductor circuits. Alternatively, the memory and the processor may be implemented as a single integrated semiconductor circuit. The processor may embody one or more processor(s).

The communication module 340 may include a wireless communication module exchanging data with external devices. The wireless communication module may wirelessly communicate with a base station or an access point (AP), and exchange data with external devices through the base station or access point.

For example, the wireless communication module may wirelessly communicate with an access point using Wi-Fi (Wi-Fi⊚, IEEE 802.11 standard), or communicate with a base station using a CDMA, WCDMA, GSM, LTE, 5G, Wibro, and the like.

Also, the wireless communication module may directly communicate with external devices. For example, the wireless communication module may exchange data with external devices in a short distance using a Wi-Fi direct, Bluetooth (Bluetooth⊚, IEEE 802.15.1 standard), Zigbee (Zigbee⊚, IEEE 802.15.4 standard), etc.

According to an embodiment, when a user's voice command is input through the microphone 210, the communication module 240 of the user terminal 200 may transmit the voice command to the communication module 340 of the dialogue management system 3.

When the voice command is received, the speech recognition module 110 of the dialogue management system 3 may convert the received voice command into text, and the natural language understanding module 120 may extract information such as an intent, entity, etc., from the converted text.

The control module 330 of the dialogue management system 3 may generate a feedback signal based on an analysis result of the voice command, and transmit the generated feedback signal to the user terminal 200.

For example, when an intent of the voice command is a control related to a specific device, a control signal for performing the control may be generated and transmitted to the user terminal 200.

Alternatively, when an intent of the voice command is provision of specific information, the corresponding information may be searched for and the retrieved information may be transmitted to the user terminal 200. Information retrieval may be performed by another external server, when required.

Alternatively, when an intent of the voice command is a request for specific content, the control module 330 may request to an external server providing the corresponding content, and transmit the corresponding content provided by the external server to the user terminal 200.

The feedback signal may include a signal for a system response as well as a signal for controlling a device or playing content. The system response is a response to a user's voice command, and when a user requests for specific information through a voice command, the system response may include the specific information.

Also, when a control of a specific device is requested by a user through a user's voice command, the system response may include a guide as to the control of the corresponding device. When additional information is required to perform a function requested by a user, the system response may include a request for the corresponding information. Through the system response described above, a user may feel as if he or she has a natural conversation with the speech recognition apparatus 100.

The control module 330 may generate the system response according to dialogue management policies. Also, the control module 330 may include a natural language generator (NLG) engine and a text to speech (TTS) engine to generate the system response. When the system response is generated as text based on an analysis result of a user's voice command in the NLG engine, the text may be converted into a voice signal in the TTS engine.

According to an exemplary embodiment of the present disclosure, the control module 330 may include a processor (e.g., computer, microprocessor, CPU, ASIC, circuitry, logic circuits, etc.) and an associated non-transitory memory storing software instructions which, when executed by the processor, provides the functionalities of communication module 330. Herein, the memory and the processor may be implemented as separate semiconductor circuits. Alternatively, the memory and the processor may be implemented as a single integrated semiconductor circuit. The processor may embody one or more processor(s).

Figure 5:
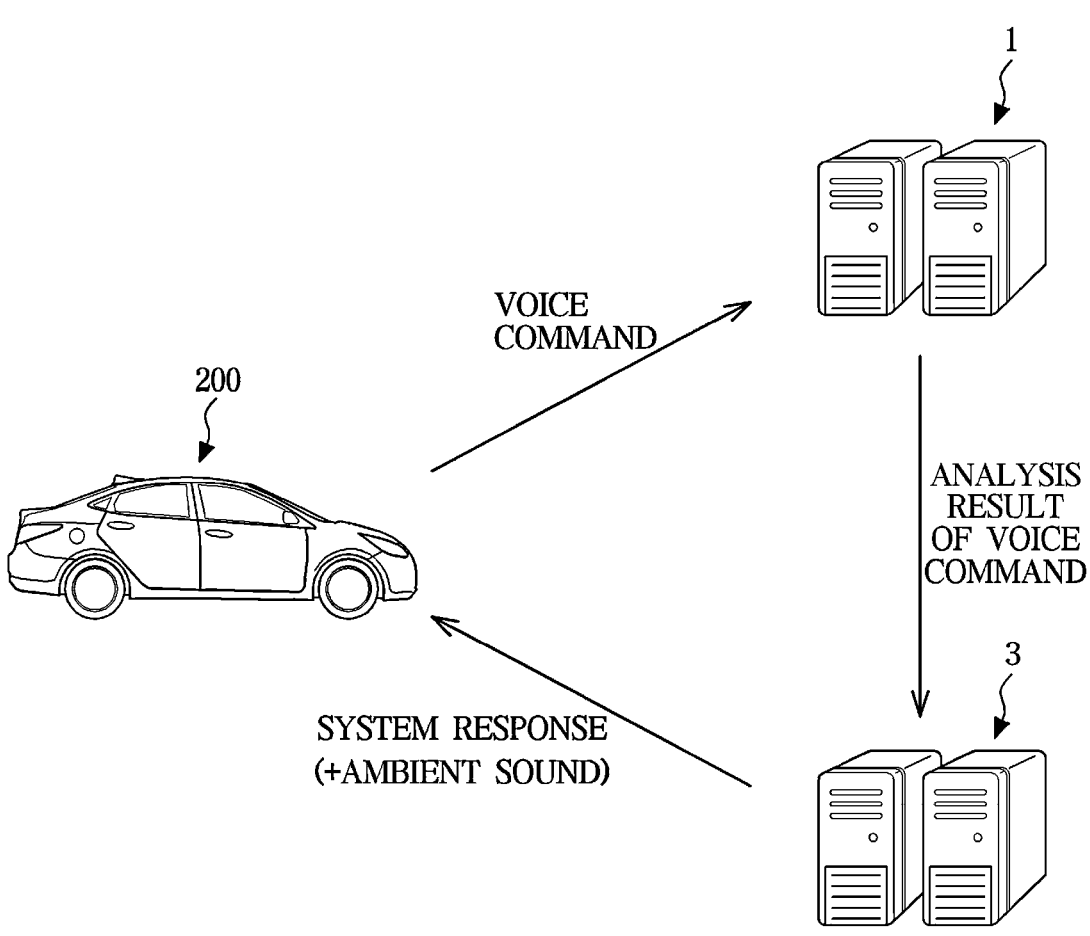

FIGS. 4 and 5 are diagrams illustrating examples where a speech recognition system and a dialogue management system are implemented as separate servers.

In the above-described example, it has been described that analysis of a voice command is performed by the dialogue management system 3. According to embodiments, however, the dialogue management system 3 and the speech recognition system 1 performing analysis of a voice command may be implemented as separate servers.

Referring to FIG. 4, when the speech recognition module 110 and the natural language understanding module 120 of the speech recognition system 1 output an analysis result of a user's voice command, the control module 130 may transmit the analysis result to the dialogue management system 3 through the communication module 140.

When the communication module 340 of the dialogue management system 3 receives the analysis result of the user's voice command from the speech recognition system 1, the control module 330 may generate an appropriate feedback signal according to dialogue management policies.

An overall process is described with reference to FIG. 5. When a user inputs a voice command through the microphone 210 provided in the user terminal 200, the communication module 240 of the user terminal 200 transmits the voice command to the speech recognition system 1.

The speech recognition module 110 and the natural language understanding module 120 of the speech recognition system 1 may extract an intent, entity, etc., by analyzing the voice command, and the communication module 140 may transmit an analysis result to the dialogue management system 3.

When the communication module 340 of the dialogue management system 3 receives the analysis result of the voice command, the control module 330 may generate a feedback signal based on the analysis result of the voice command and transmit the generated feedback signal to the user terminal 200.

As described above, the feedback signal may include a system response. The control module 330 may collect an ambient sound matching the voice command in real time in order to provide a sense of presence to the user, and transmit the collected ambient sound together with the system response to the user terminal 200.

Although the example where the voice command input to the user terminal 200 is transmitted to the speech recognition system 1 has been described above, embodiments of the disclosure are not limited thereto. That is, a voice command input to the user terminal 200 may be transmitted to the dialogue management system 3, and the dialogue management system 3 may transmit the voice command to the speech recognition system 1, and then receive an analysis result of the voice command.

However, in the embodiment described below, an example where a voice command is transmitted to the speech recognition system 1 is described for a detailed description.

Meanwhile, the dialogue management system 3 may include at least one memory and at least one processor. A program for performing the aforementioned operations of the control module 330 may be stored in the at least one memory, and the at least one processor may execute the stored program.

Figure 6:
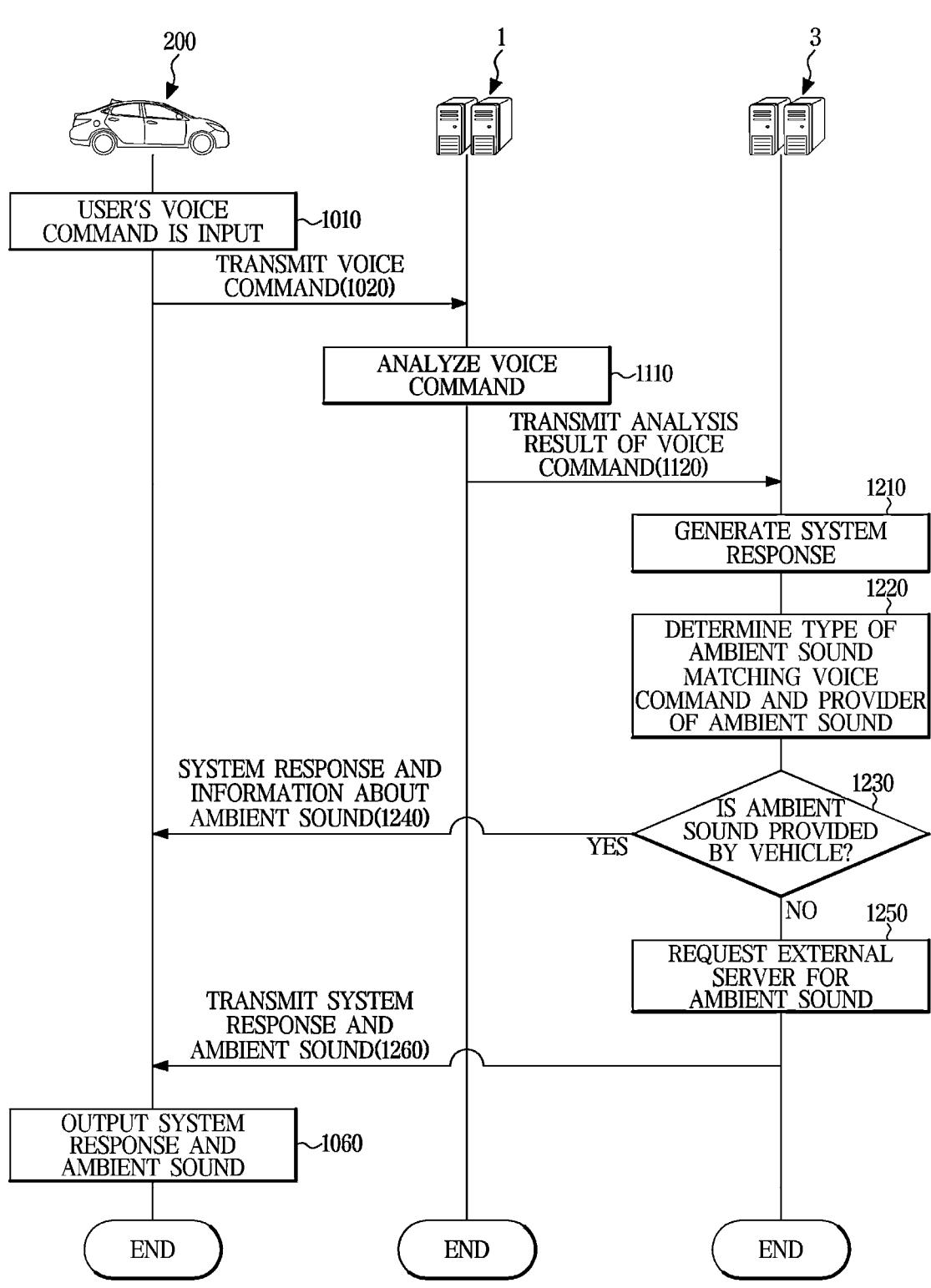
FIG. 6 is a flowchart illustrating a control method of a user terminal and a dialogue management method according to an embodiment.

FIG. 6 is a flowchart illustrating a control method of a user terminal and a dialogue management method according to an embodiment.

In a control method of a user terminal according to an embodiment, an object of control is the user terminal 200 according to the above embodiments, and the user terminal 200 may be a vehicle. A dialogue management method according to an embodiment may be performed by the dialogue management system 3. Accordingly, the above descriptions on the user terminal 200 and the dialogue management system 3 are equally applicable to the control method of user terminal and the dialogue management method, even when not specifically described below. Also, descriptions on the control method of user terminal and the dialogue management method may also be applied to the user terminal 200 and the dialogue management system 3, even when not specifically described below.

Referring to FIG. 6, a user's voice command is input through the microphone 210 provided in the user terminal 200 (1010).

Meanwhile, although not illustrated, a wake-up signal for triggering a speech recognition function may be input before receiving the voice command. The wake-up signal may be input through a push-to-talk (PTT) button provided in the inputter 270, and when the wake-up signal is input, the controller 230 may open the microphone 210.

Alternatively, the microphone 210 may be open all the time, and the wake-up signal may be input in a form of wake-up word uttered by a user.

The communication module 240 of the user terminal 200 transmits the input voice command to the speech recognition system 1 (1020).

The speech recognition module 110 and the natural language understanding module 120 of the speech recognition system 1 analyze the received voice command (1110).

As described above, the speech recognition module 110 may convert the voice command into text, and the natural language understanding module 120 may extract information such as an intent, entity, etc., from the text.

The communication module 140 of the speech recognition system 1 may transmit an analysis result of the voice command to the dialogue management system 3 (1120).

When the information about the voice command is received, the control module 330 of the dialogue management system 3 generates a system response corresponding to the voice command based on the analysis result of the voice command (1210).

Like the example, when analysis of the voice command is performed by a separate speech recognition system 1, the information about the voice command received by the dialogue management system 3 may include the analysis result of the voice command received from the speech recognition system 1.

Alternatively, when analysis of a voice command is performed by the dialogue management system 3, information about the voice command received by the dialogue management system 3 may include the voice command. In this case, speech recognition and natural language understanding may be performed by the dialogue management system 3.

The control module 330 may generate the system response corresponding to the voice command using an NLG engine and a TTS engine. Alternatively, the system response in text form generated using the NLG engine may be transmitted to the user terminal 200, and the text-type system response may be converted into a voice signal in the TTS engine, provided in the user terminal 200, and be output.

The system response corresponding to the voice command may vary depending on an intent or entity of the voice command. As described above, when an intent of a user's voice command is a request for specific information, the specific information may be included in a system response.

Also, when an intent of a voice command is a request for controlling a specific device, a guide for controlling the device may be included in a system response. When additional information is required to perform a function requested by a user, a request for the corresponding information may be included in a system response.

The control module 330 may determine a type of ambient sound matching the voice command and a provider of the ambient sound (1220).

The ambient sound matching the voice command is a sound that provides a sense of presence to the user, and may be related to an intent or entity of the voice command. Also, the ambient sound may be a sound obtained in real time.

For example, when an intent of a voice command corresponds to a request for information about a state of a specific game in progress, an ambient sound matching the voice command may be a sound generated in a corresponding stadium, i.e., a sound collected from a microphone installed in the stadium.

Alternatively, when an intent of a voice command corresponds to a control of a constituent component of a vehicle, an ambient sound matching the voice command may be a sound generated by the control of the corresponding constituent component.

Alternatively, when an intent of a voice command corresponds to a request for information about weather in a specific area, an ambient sound matching the voice command may be a sound generated in the corresponding area, i.e., a sound collected from a microphone installed in the area, for example, a sound collected from a microphone installed outside a local meteorological service center of the area, such as sounds of rain, wind, thunder, and the like.

Alternatively, when an intent of a voice command corresponds to a request for a specific sound, an ambient sound matching the voice command may be a requested sound. For example, an ambient sound matching the voice command may be a sound of waves collected from a microphone installed on a beach, a sound of forest collected from a microphone installed in a forest (sound of leaves or branches hitting each other when wind blows), a sound of waterfall collected from a microphone installed near a waterfall, a sound of flowing valley water collected from a microphone installed near a valley, and the like.

Alternatively, when an intent of a voice command corresponds to a request for stock information, an ambient sound matching the voice command may be a sound collected from a microphone installed inside a stock exchange.

A provider of an ambient sound may vary depending on a type of the ambient sound matching a voice command. When an ambient sound matching a voice command relates to a control of the user terminal 200, a provider of the ambient sound may be the user terminal 200, and an ambient sound which is not provided by the user terminal 200 may be obtained from an external server.

When the provider of the ambient sound is the user terminal 200 (Yes in operation 1230), the system response together with information about the ambient sound matching the voice command are transmitted to the user terminal 200 (1240).

The controller 230 of the user terminal 200 that receives the information about the ambient sound may open the microphone 210 at a location capable of collecting the corresponding ambient sound, thereby obtaining the ambient sound.

When the provider of the ambient sound is not the user terminal 200 (No in operation 1230), the ambient sound may be requested to an external server using an application programming interface (API) (1250).

However, a method of obtaining an ambient sound is not limited, another method of obtaining an ambient sound may be encompassed by a scope of the disclosure. For example, an ambient sound may be obtained by itself from devices such as a microphone connected to the dialogue management system 3.

When the ambient sound is obtained, the system response and the ambient sound may be transmitted to the user terminal 200 (1260).

The controller 230 of the user terminal 200 may output the ambient sound, obtained from the microphone 210, or the ambient sound, obtained from the dialogue management system 3, together with the system response, through the speaker 220 (1060).

The user hears the system response to the user's voice command together with the ambient sound matching the voice command, thereby feeling a sense of presence and a sense of immersion in real time and intuitively being provided with information.

Meanwhile, an ambient sound matching a voice command may be non-existent or a may not be provided. In this case, the dialogue management system 3 may transmit only the system response to the user terminal 200.

Figure 7:
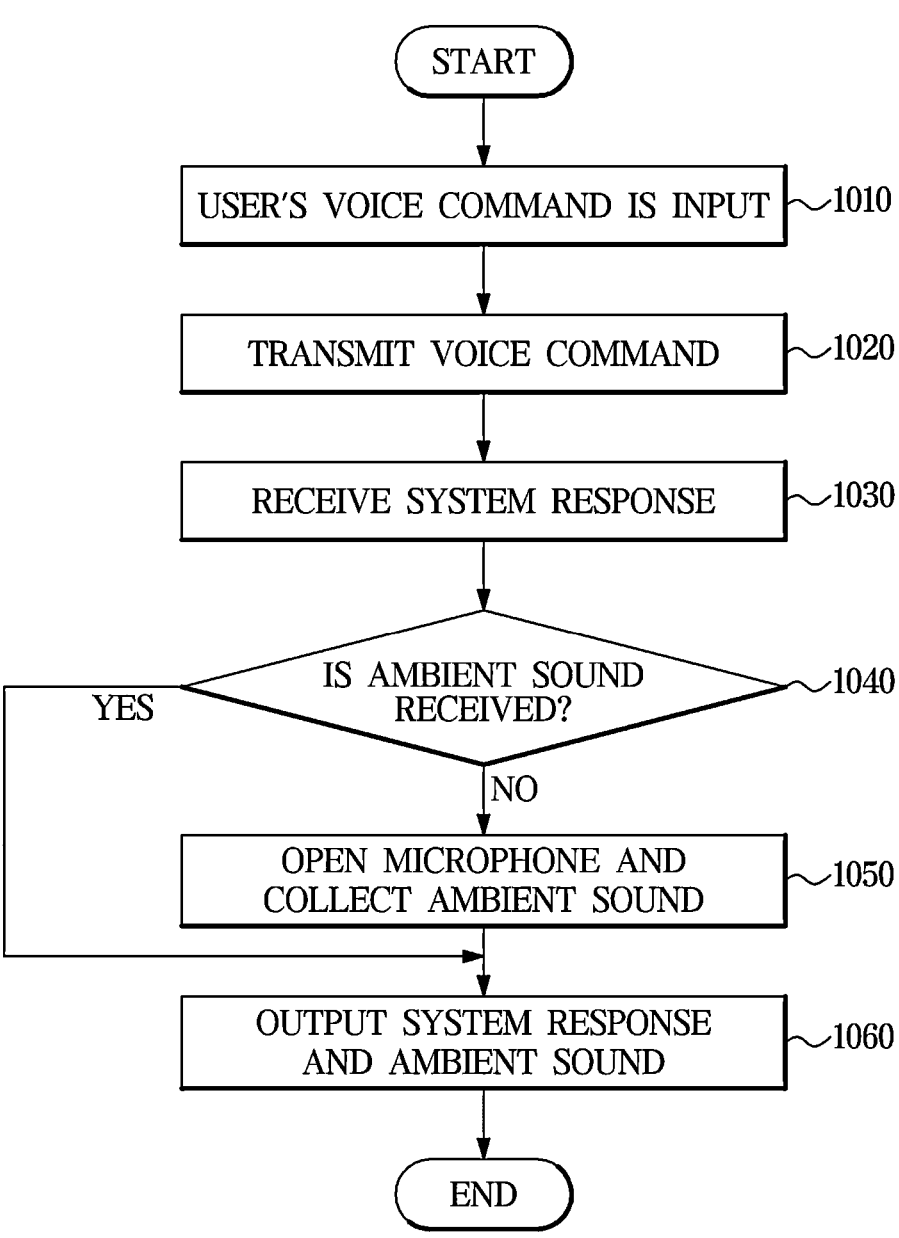
FIG. 7 is a flowchart illustrating a control method of a user terminal according to an embodiment in greater detail.

FIG. 7 is a flowchart illustrating a control method of a user terminal according to an embodiment in greater detail. The flowchart of FIG. 7 is written from a perspective of user terminal, and descriptions on the same reference numerals as those of FIG. 6 are the same as described above.

Referring to FIG. 7, when a user's voice command is input through the microphone 210 (1010), the communication module 140 transmits the input voice command to the speech recognition system 1 or the dialogue management system 3 (1020).

As described above, the speech recognition system 1 or the dialogue management system 3 may perform analysis of the voice command, and the dialogue management system 3 may generate a system response corresponding to the voice command based on an analysis result of the voice command.

The user terminal 200 may receive the system response corresponding to the voice command from the dialogue management system 3 (1030).

Also, because the dialogue management system 3 may determine a provider of an ambient sound matching the voice command, when the provider of the ambient sound is the user terminal 200, information about the ambient sound may be transmitted together with the system response.

When the user terminal 200 does not receive the ambient sound (No in operation 1040), i.e., because the provider of the ambient sound is a vehicle, when information about the ambient sound is received instead of the ambient sound, the user terminal 200 may open the microphone 210 based on the information about the ambient sound and collect the ambient sound (1050).

The information about the ambient sound may include information about an intent or entity corresponding to the voice command. For example, when an intent of the voice command corresponds to a control of a specific constituent component of the user terminal 200, the controller 230 may open the microphone 210 which is closest to the specific constituent component, and collect the ambient sound generated when controlling the constituent component. Specifically, when the user terminal 200 is a vehicle, the controller 230 may open a second microphone located on at least one of a rear seat area or an exterior surface of the vehicle.

When the provider of the ambient sound is not the user terminal 200, an ambient sound obtained from the dialogue management system 3 may be transmitted to the user terminal 200.

When the ambient sound is received from the dialogue management system 3 or collected from the microphone 210, the controller 230 may control the speaker 220 to output the ambient sound together with the system response (1060).

In the flowchart, an example where the ambient sound matching the voice command exists has been described. However, an ambient sound matching a voice command may be non-existent or not be obtained. In this case, it is apparent to those skilled in the art that a system response may be output without an ambient sound.

FIGS. 8 to 11 are diagrams illustrating examples of a user's voice command input to a user terminal and a feedback signal output in response to the user's voice command according to an embodiment.

Figure 8:
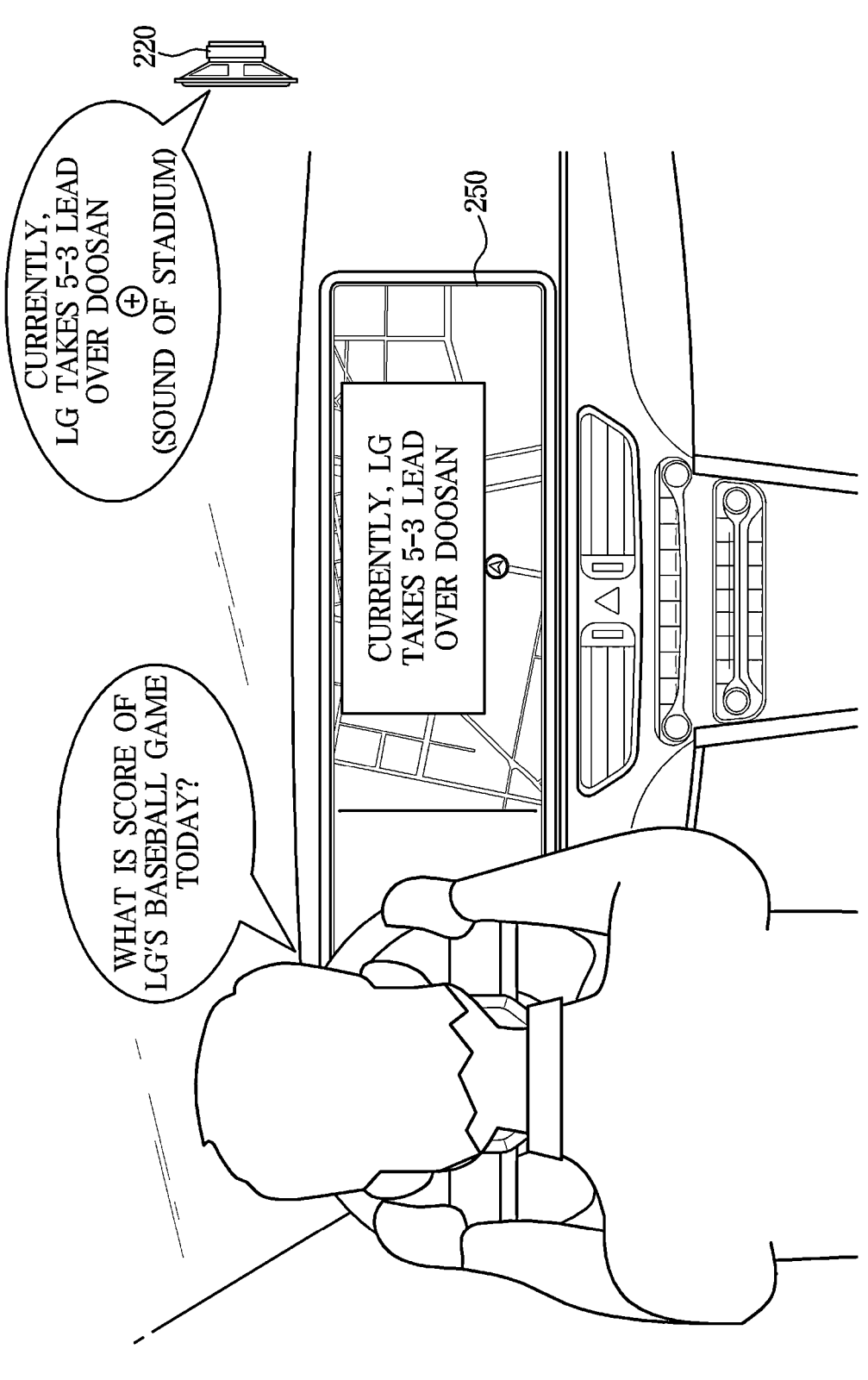
FIGS. 8 to 11 are diagrams illustrating examples of a user's voice command input to a user terminal and a feedback signal output in response to the user's voice command according to an embodiment.

As shown in FIG. 8, when a user inputs a voice command, "what is the score of the LG's baseball game today?", through the microphone 210, an ambient sound matching the voice command may be a sound of a stadium where the LG's baseball game is held, i.e., a sound collected from a microphone installed in the corresponding stadium in real time.

When the ambient sound and a system response are received from the dialogue management system 3, the sound of the stadium may be output together with the system response such as "currently, LG takes a 5-3 lead over Doosan" through the speaker 220.

Figure 9:
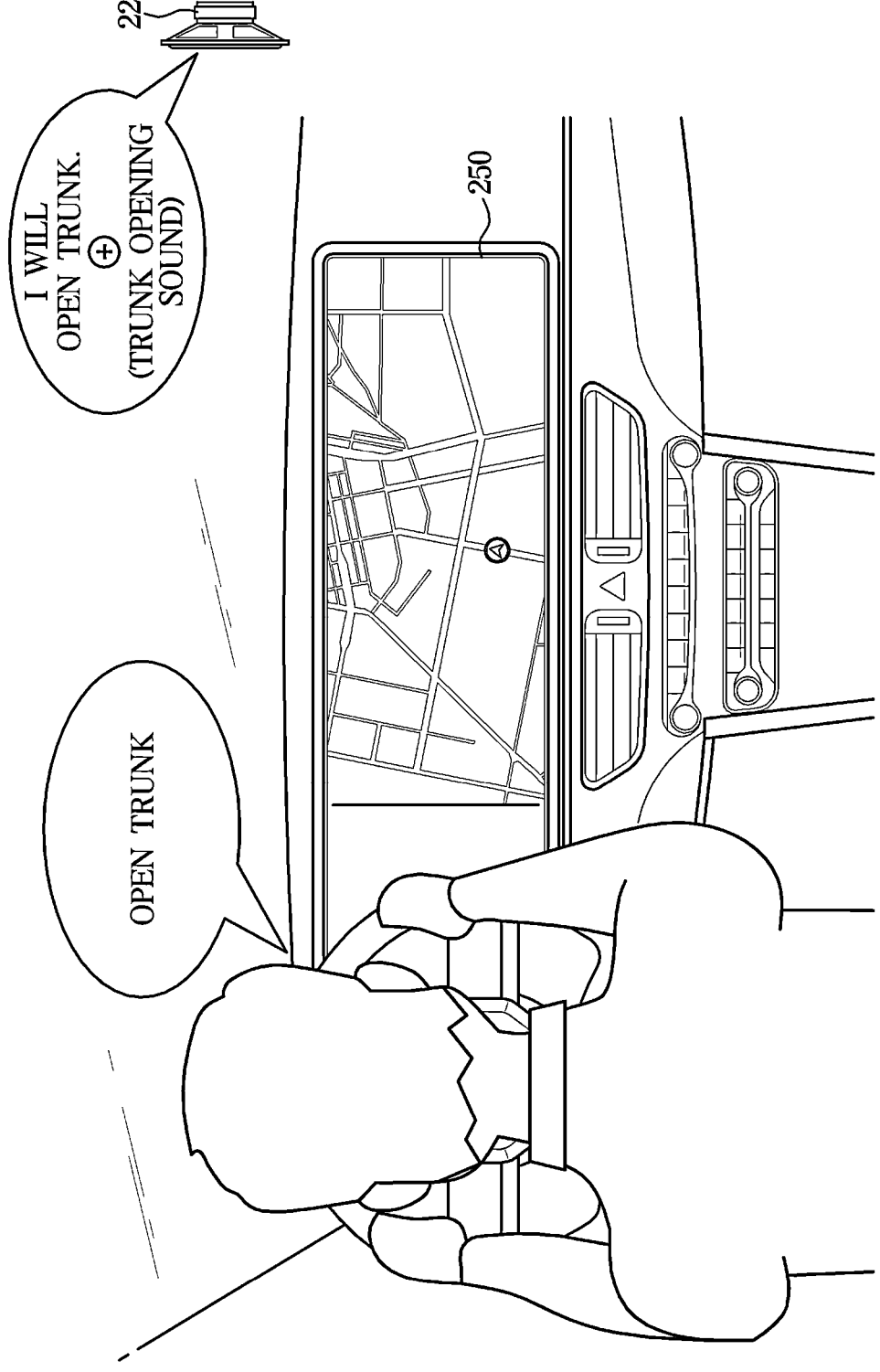

As shown in FIG. 9, when a user inputs a voice command, "open the trunk", through the microphone 210, an ambient sound matching the voice command may be a sound generated when opening the trunk, i.e., a sound collected from a microphone installed closest to the trunk in real time.

When information about the ambient sound and a system response are received from the dialogue management system 3, the controller 230 may open a second microphone installed adjacent to the trunk on an exterior surface of a vehicle and collect the ambient sound. When collecting the ambient sound is completed, the trunk opening sound may be output together with the system response such as "I will open the trunk" through the speaker 220.

Figure 10:
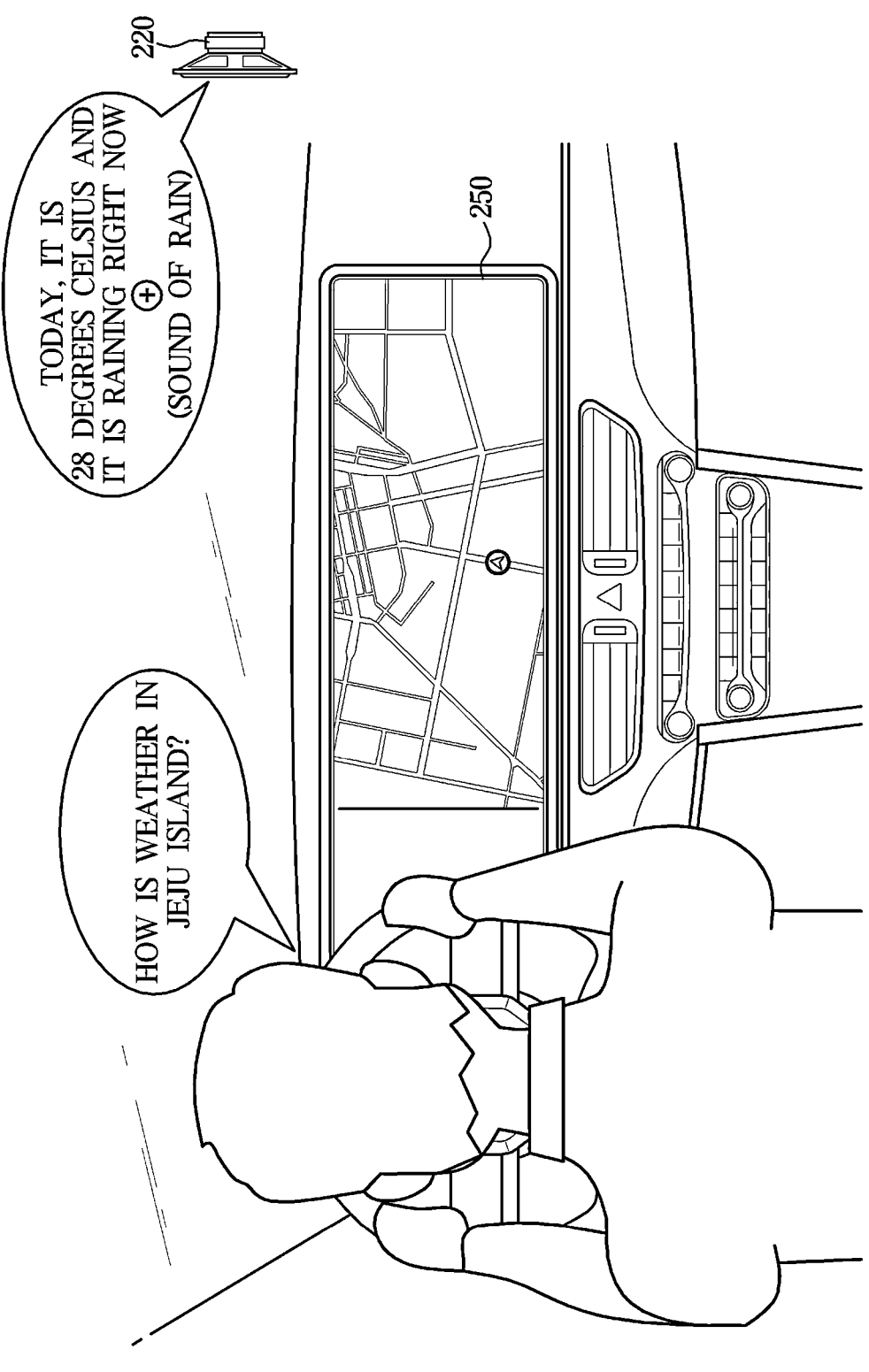

As shown in FIG. 10, when a user inputs a voice command, "how is the weather in Jeju island today?", through the microphone 210, an ambient sound matching the voice command may be a sound related to a current weather in Jeju island. The sound may be collected from a microphone installed outside a local meteorological service center in Jeju island in real time.

When the ambient sound and a system response are received from the dialogue management system 3, the sound of rain collected in real time may be output together with the system response such as "it's 28 degrees Celsius and it's raining" through the speaker 220.

Figure 11:
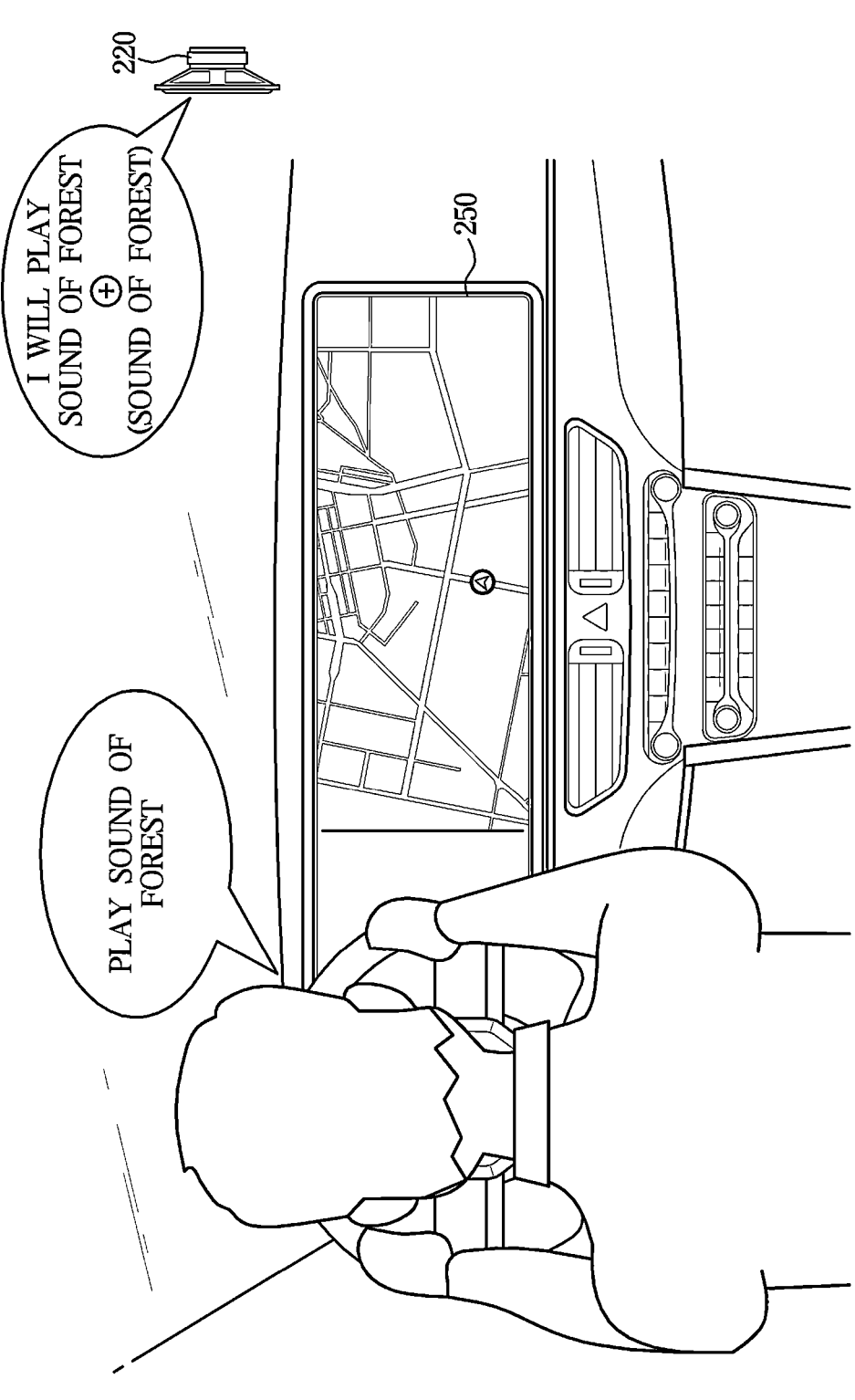

As shown in FIG. 11, when a user inputs a voice command, "play the sound of forest", through the microphone 210, an ambient sound matching the voice command may be a sound collected in a forest, i.e., a sound collected from a microphone qinstalled in a forest.

When the ambient sound and a system response are received from the dialogue management system 3, the sound of forest collected in real time may be output together with the system response such as "I will play the sound of forest" through the speaker 220.

As is apparent from the above, according to the embodiments of the disclosure, the user terminal, the control method thereof, the dialogue management system and the dialogue management method can output an ambient sound related to a user intention in real time together with a system response to a user's voice command, thereby providing a user with a sense of presence and enabling a natural dialogue with the user.

Meanwhile, embodiments can be stored in the form of a recording medium storing computer-executable instructions. The instructions may be stored in the form of a program code, and when executed by a processor, the instructions may perform operations of the disclosed embodiments. The recording medium may be implemented as a non-transitory computer-readable recording medium.

The non-transitory computer-readable recording medium includes all kinds of recording media in which instructions which may be decoded by a computer are stored of, for example, a read only memory (ROM), random access memory (RAM), magnetic tapes, magnetic disks, flash memories, optical recording medium, and the like.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A user terminal, comprising:
at least one microphone;
a speaker;
a communication module configured to communicate with a server; and
a controller configured to control the speaker to output a system response corresponding to a voice command of a user based on a user's voice command input through the at least one microphone,
wherein the controller is further configured to control the speaker to output, together with the system response, an ambient sound matching the voice command, the ambient sound being collected in real time,
wherein, when an intent corresponding to the voice command relates to a control of a constituent component of a vehicle, the controller is configured to open a second microphone adjacent to the constituent component of the vehicle among at least one second microphone of the at least one microphone to collect the ambient sound.

2. The user terminal of claim 1, wherein the controller is configured to collect the ambient sound using the at least one microphone.

3. The user terminal of claim 1, wherein the user terminal is the vehicle, and
the at least one microphone comprises:
a first microphone to which the user's voice command is input; and the at least one second microphone provided in at least one of a rear seat area or an exterior surface of the vehicle.

4. The user terminal of claim 3, wherein, when the ambient sound matching the voice command is obtainable from the vehicle, the controller is configured to open the at least one second microphone to collect the ambient sound.

5. The user terminal of claim 4, wherein, when an intent corresponding to the voice command relates to a control of a constituent component of the vehicle, the controller is configured to control the speaker to output the system response received from the server and the ambient sound collected from the second microphone.

6. The user terminal of claim 1, wherein the communication module is configured to receive the system response and the ambient sound from the server.

7. A dialogue management system, comprising:
a communication module configured to receive information about a voice command of a user; and
a control module configured to determine a provider of an ambient sound matching the voice command, in response to a determination that the provider of the ambient sound matching the voice command is an external server, the control module configured to control the communication module to request the external server to collect the ambient sound in real time, and
in response to a determination that the provider of the ambient sound matching the voice command is a user terminal to which a user's voice command is input, the control module configured to control the communication module to request the user terminal to collect the ambient sound in real time, wherein information about the user's voice command includes an intent and an entity corresponding to the user's voice command, and the ambient sound matching the voice command includes a sound collected in real time in connection with the intent and the entity.

8. The dialogue management system of claim 7, wherein the control module is configured to generate a system response corresponding to the voice command, and in response to the determination that the provider of the ambient sound matching the voice command is the user terminal, the control module is configured to control the communication module to transmit the system response to the user terminal.

9. The dialogue management system of claim 7, wherein the control module is configured to generate a system response corresponding to the voice command, and in response to the determination that the provider of the ambient sound matching the voice command is the external server, the control module is configured to control the communication module to transmit the system response and the ambient sound, provided from the external server, to the user terminal.

10. A control method of a user terminal comprising at least one microphone and a speaker, the control method comprising:
receiving a voice command of a user through the at least one microphone;
obtaining a system response corresponding to the voice command;
obtaining, in real time, an ambient sound matching the voice command; and
outputting the system response together with the ambient sound through the speaker, wherein, when an intent corresponding to the voice command relates to a control of a constituent component of a vehicle, the outputting of the system response together with the ambient sound comprises outputting the system response received from a server and the ambient sound collected from at least one second microphone of the at least one microphone.

11. The control method of claim 10, wherein the obtaining of the ambient sound matching the voice command comprises collecting the ambient sound using the at least one microphone.

12. The control method of claim 10, wherein the user terminal is the vehicle, the at least one microphone comprises:

a first microphone to which a user's voice command is input; and the at least one second microphone provided in at least one of a rear seat area or an exterior surface of the vehicle, and the obtaining of the ambient sound matching the voice command comprises opening the at least one second microphone to collect the ambient sound from the vehicle.

13. The control method of claim 10, wherein the obtaining of the ambient sound matching the voice command comprises receiving the system response from a server.

14. The control method of claim 10, wherein the obtaining of the ambient sound matching the voice command comprises receiving the ambient sound from a server.

15. A dialogue management method, comprising:

receiving information about a voice command of a user;

determining a provider of an ambient sound matching the voice command;

in determination that the provider of an ambient sound matching the voice command is an external server, requesting the external server to collect the ambient sound in real time, and in determination that the provider of an ambient sound matching the voice command is a user terminal to which a user's voice command is input, requesting the user terminal to collect the ambient sound in real time, wherein information about the user's voice command includes an intent and an entity corresponding to the user's voice command, and the ambient sound matching the voice command includes a sound collected in real time in connection with the intent and the entity.

16. The dialogue management method of claim 15, further comprising:

generating a system response corresponding to the voice command; and in response to the determination that the provider of an ambient sound matching the voice command is the user terminal, transmitting the system response to the user terminal.

17. The dialogue management method of claim 15, further comprising:

generating a system response corresponding to the voice command; and in response to the determination that the provider of an ambient sound matching the voice command is the external server, transmitting the system response and the ambient sound, provided from the external server, to the user terminal.

\* \* \* \* \*